United States Patent Office 3,022,176
Patented Feb. 20, 1962

3,022,176
PROCESS FOR IMPROVING THE FLAVOR OF CULTURED MILK PRODUCTS AND THE RESULTING PRODUCT
Robert L. Lawrence, Middlesex, N.J., and George A. Perry, Elmhurst, N.Y., assignors to Corn Products Company, New York, N.Y., a corporation of Delaware
No Drawing. Filed May 13, 1960, Ser. No. 28,859
21 Claims. (Cl. 99—162)

This invention relates to an improved flavor-rich cultured milk product and to a process of producing the same. More particularly, this invention relates to a cultured milk product having a prolonged flavor-life and to an improved process for retaining the flavor and retarding the spoilage of said product.

This invention is a continuation-in-part of our co-pending application, Serial Number 814,162, filed May 19, 1959 and issued as U.S. Patent No. 2,974,046, March 7, 1961.

Cultured milk products such as creamed cottage cheese, pot cheese, cream cheese, baker's cheese, yoghurt, cultured buttermilk and the like, and mixtures thereof with added fruits and vegetables, despite required processing, i.e. pasteurization, contain microorganisms which multiply rapidly thus contributing to the spoilage and development of undesirable flavors even at refrigerator temperatures.

Many attempts have been made to solve this problem, with the view towards improving the quality of the products, particularly with respect to creamed cottage cheese. However, these attempts were of little value since no effective control of spoilage microorganisms could be obtained, particularly those associated with surface growth of commercially packed products.

It is therefore an object of our invention to provide an improved cultured milk product having improved organoleptic qualities.

It is a further object of this invention to provide an improved cultured milk product having a prolonged flavor-life.

It is another object of this invention to provide an improved cultured milk product which retards the growth of spoilage microorganisms and encourages the growth of aroma formers.

It is another object of this invention to provide a process for producing an improved flavor-rich cultured milk product.

These and other objects will be apparent from the following detailed description and examples.

According to this invention, there is provided a cultured milk product containing large numbers of added microorganisms of the family Lactobacteriaceae and a sorbic acid component in an amount equivalent to about 0.025% to about 0.15% by weight of sorbic acid, said product having a pH of from about 4.3 to about 5.5.

This invention also provides for an improved process of producing a cultured milk product which comprises inoculating a milk substrate with large numbers of flavor-forming microorganisms of the family Lactobacteriaceae, incubating said inoculated milk substrate for a period of from about 4 to 48 hours or until total counts reach about 10 million to about 1 billion per gram at temperatures in the range of from about 50° F. to 90° F., and thereafter adding salt and a sorbic acid component in an amount such that the final cultured milk product has from about 0.025% to 0.15% sorbic acid.

In carrying out our process, we introduce into the milk substrate a culture of microorganisms capable of growing at low temperatures such as 45° F. and lower, and possessing the unique characteristic of multiplying in the presence of chemical preservatives, such as sorbic acid and salts thereof. We have found that the family Lactobacteriaceae and especially those microorganisms belonging to the genus Leuconostoc have this characteristic. These flavor-forming groups of microorganisms possess the characteristic of being tolerant to sorbic acid and of being able to multiply at low temperatures, while contaminants of a psychrophilic nature are effectively restrained by the sorbic acid component which functions as a preservative. These spoilage microorganisms which grow at low temperatures destroy the desirable products of flavor-forming bacteria. Thus, by introducing into the milk substrate helpful flavor-forming microorganisms and a sorbic acid component, not only are we able to prevent the growth of spoilage microorganisms, but due to the selectivity on the part of the sorbic acid and its edible salts, we are able to improve the flavor of the cultured milk product by encouraging the growth of these flavor-forming microorganisms. Henceforth, in this application when we refer to a sorbic acid component, it will be understood to include both the acid and its edible salts such as sodium, potassium or calcium sorbate and the like. The amount of sorbic acid component employed is based on the weight of sorbic acid in the component.

In the manufacture of creamed cottage cheese, for example it is customary to pasteurize a milk substrate such as skim milk and then inoculate the substrate with a starter culture, with or without the addition of the enzyme rennin. The resultant coagulated milk substrate is then cut, cooked, drained and washed. If a creamed product is desired, the curd is then mixed with a cream dressing usually containing about 12% to about 18% of butter fat, or more if so desired, and with salt and other agents to improve its stability. The cream dressing is aged at refrigerator temperatures prior to use. Thus the flavor of the creamed cottage cheese largely depends upon the contribution of the microorganisms introduced with the starter culture, most of which do not survive the processing, and consequently, the cream dressing's contribution to flavor is limited to the butter fat.

Due to the insignificant number of flavor-forming microorganisms in the cooked curd, they cannot with constant regularity contribute desirable flavor to the product. Contaminants of a psychrophilic and mesophilic nature, namely yeasts, molds and certain bacteria further hinder this process due to their rapid growth which results in proteolysis, lipolysis and destruction of flavor compounds.

The present invention solves the problems mentioned above by the incorporation into the milk substrate or the cream dressing of desirable flavor-forming microorganisms such as those of the family Lactobacteriaceae together with a sorbic acid component.

In order to secure the most intense flavor formation, the flavor-forming microorganisms present in the milk substrate should be in the range corresponding to that of a fully cultured milk. This condition is usually obtained by introducing a heavy, actively growing inoculum of about 1% to 15% and preferably 8% to about 10% by weight of said inoculum into a milk substrate. Edible milk products such as milk, whey, curd or cream may serve as the substrate. The amount of sorbic acid introduced into the finished cultured milk product is about 0.025% to about 0.15% by weight of the cultured milk product. Preferably, at the time of inoculation of said milk substrate with said flavor-forming microorganisms, we prefer to add to said milk substrate a small amount of sorbic acid component such that it does not restrict the growth of aroma-formers, i.e. an amount equivalent to about .05% to 0.15% sorbic acid. The remainder of the sorbic acid required to maintain a desirable concentration in the finished product is added to the milk substrate following processing.

A two-stage culturing procedure is needed for cultured milk products of the non-cheese variety like yoghurt, sour cream and cultured buttermilk.

Generally the milk substrate which has been inoculated with the flavor-forming microorganisms is incubated for a period of about 4 to about 48 hours, preferably about 10 to about 18 hours at a temperature in the range of about 50° F. to about 90° F. preferably about 60° F. to about 80° F. A starter culture is added to said fermented milk substrate and the mixture is allowed to incubate for an additional 4 to about 48 hours at about 50° F. to about 90° F. Following incubation, salt and additional sorbic acid component are added to the milk substrate in an amount such that the final milk product will contain from about 0.025% to about 0.15% sorbic acid. These cultured milk products usually have a pH of about 4.5 to about 5.0 and may be used for preparing a flavor-rich butter or margarine.

The cultured milk product of this invention may be produced in a number of ways, the only essential requirement being that the final product have a growing culture of microorganisms of the family Lactobacteriaceae and also contain a sorbic acid component in an amount equivalent to about 0.025% to about 0.15% by weight sorbic acid. For example, a creamed cultured milk product such as creamed cottage cheese may be prepared by performing a preliminary fermentation of cream, containing if desired about 0.02% to about 0.15% sorbic acid, by inoculation of said cream with large numbers of flavor-forming microorganisms of the family Lactobacteriaceae, preferably of the genus Leuconostoc and then incubating said inoculated cream for a period of up to 48 hours and at temperatures of from about 50° F. to about 90° F. At the end of the incubation period, salt is added and sorbic acid component is added in the amounts required to maintain 0.025% to 0.15% sorbic acid in the finished product, e.g. about 0.08% to about 0.3%. The fermented cream is then chilled to a temperature of about 35° F. to 45° F. prior to mixing it with curd. Alternatively, the creamed cultured milk product may be prepared by using sterilized whey as the medium upon which to grow the flavor-forming microorganisms. Usually, the incubation is continued until such time as the numbers of flavor-forming microorganisms produced are in the range corresponding to that of fully cultured milk. Thereupon the fermented whey is mixed preferably in about a 50–50 proportion with a cream containing about 24% to about 36% butter fat and also containing an amount of sorbic acid component such that the final product contains about 0.025% to 0.15% sorbic acid, e.g. about 0.1 to 0.6% sorbic acid. The resultant mixture is then added to the curd. If desired the whey may be subjected to a heat treatment, after growth of the aroma-formers followed by rapid chilling in an ice bath to induce a shock rupturing of cells prior to mixing with the cream.

In the event that a non-creamed product such as pot cheese is desired, the aroma-formers are added to a milk substrate such as milk containing a small amount of a sorbic acid component such as about 0.01% to about 0.06% sorbic acid prior to introduction of the starter culture or also rennin solution. After culturing, cutting, cooking and draining said cultured milk product, additional sorbic acid is added to the curd such that the final product contains about 0.025% to about 0.15% sorbic acid. If desired, following culturing, the sorbic acid component and a heavy suspension of cells of the aroma-forming microorganisms may be worked into the product.

In preparing a blended cultured milk product, it is possible to use the whey as a part or as the sole constituent of the dressing. For example, the whey may be sterilized by filtration using a Seitz filter or similar arrangement and then inoculated with the aroma forming microorganisms and then incubated. The full amount of sorbic acid or its salts may be added after the flavor development. Alternatively, the fermented whey with the sorbic acid, may be subjected to physical disintegration such as by sonic oscillation, explosion by sudden release of pressure, or a combination of mild heating and shock chilling whereby the bacterial cells are ruptured or other means so that enzymes are released. The full amount of sorbic acid component is then added and the mixture used for blending. If desired citric acid or sodium citrate may be added to the sterilized whey prior to inoculation with flavor-forming bacteria.

The fermented whey containing sorbic acid or its salts in amounts from about 0.1% to about 0.9% may be also sprayed onto a curd in order to form a cottage cheese curd having improved shelf-life.

The following examples are illustrative of the invention and it is obvious to those skilled in the art that many variations are possible without departing from the spirit and scope of this invention.

*Example 1*

To 6 pounds of dry curd of pH 4.9 was added 2 pounds of cream dressing containing 16% butter fat and 4% salt. After blending, the mixture was packaged in 12-ounce waxed containers and capped with transparent plastic lids. The tubs of creamed cottage cheese were stored at 45° F. and examined periodically for flavor, odor and microbial growth. After 6 days, the total microbial count on nutrient agar exceeded 11,000,000 per gram consisting mainly of large colonies of gram-negative spoilage bacteria and yeasts. The fresh flavor had disappeared and sourness developed and after 9 days visible growth on the surface was clearly noticeable.

*Example 2*

To 6 pounds of dry curd of pH 4.9 was added 2 pounds of cream dressing of 16% butter fat content. A pure culture of flavor-forming bacteria of the genus Leuconostoc was added to the cream dressing and said inoculated cream was held at 72° F. for 16 hours. After this time 4% salt was dissolved in the cultured cream which was then blended with curd. The product was packaged as per Example 1 and held at 45° F. After 7 days a slight "off" odor and flavor characterized by sourness was noticeable and total microbial counts were in excess of $1 \times 10^8$ per gram, about equally divided between contaminants and flavor-forming bacteria. Spoilage was not prevented and after 9 days surface growth was evident.

*Example 3*

To 6 pounds of curd of pH 4.9 was added 2 pounds of cream dressing of 16% butter fat content and which also contained 0.20% sorbic acid and 4% salt. This product was packaged as per Example 1. After 15 days at 45° F. there was a mild, clean flavor-development, which was completely free of sourness. Plate counts were 1,000,000 per gram, mostly of the non-spoilage aroma type microorganisms.

*Example 4*

To 6 pounds of curd of pH 4.9 was added 2 pounds of cream dressing of 16% butter fat content which had been inoculated with a culture of flavor-forming bacteria of the genus Leuconostoc and said bacteria were permitted to act upon the cream at 72° F. for 18 hours. After this time, 0.2% sorbic acid and 4% salt were added. A good, flavorful, mildly-aromatic fresh cheese (not sour) resulted and after 15 days the plate counts were $1.5 \times 10^8$ and no contaminants were found.

*Example 5*

A batch of creamed cottage cheese was prepared exactly as Example 4 except that 0.07% sorbic acid was added to the cream prior to inoculation with Leuconostoc, the remainder being added after incubation. The flavor of this product improved over its original freshness and held at a high level for more than 15 days. The counts of aroma-formers were $1.7 \times 10^8$ and no contaminants were found.

As shown in Example 1, the experimental cheese did not possess good keeping quality and was poorest in flavor. Neither was the product of Example 2 markedly different despite the fact that aroma-formers were present in large numbers. Growth of contaminants was the cause of gradual deterioration and loss of flavor in the cheeses of Examples 1 and 2.

Example 3 illustrates the effectiveness of sorbic acid towards inhibiting the growth of spoilage microorganisms. The cheese of Example 3 is also lacking in flavor development due to the small numbers of Leuconostoc present. The beneficial effect of the combination of large numbers of Leuconostoc and sorbic acid is clearly demonstrated in Examples 4 and 5 and the beneficial effect of controlling the growth of spoilage microorganisms is shown.

*Example 6*

To 2 pounds of pasteurized skim milk of 10% total solids content was introduced under aseptic conditions 18 grams of starter culture. This starter culture was originally obtained from a dairy supply house and was carried in pasteurized skim milk. The numbers of cells per gram were 800,000,000. After incubating for 72° F. for 18 hours the cultured milk was cooled to 45° F. and held at this temperature. The flavor after 2 days was somewhat sour and this sour quality persisted for 2 weeks after which time the experiment was terminated.

*Example 7*

To 2 pounds of pasteurized skim milk containing 0.05% sorbic acid was added 90 grams of actively growing microorganisms of the genus Leuconostoc. These aroma-formers were previously carried in sterile whole milk and had reached total counts of 700,000,000 per gram. The inoculated skim milk was held at 72° F. for 18 hours and then 18 grams of starter culture was added and the mixture was incubated for 16 hours longer at 72° F. The product was chilled to 45° F. The cultured buttermilk had a good, clean flavor with none of the sour quality which was apparent in the control. After 15 days the favor was still fresh.

*Example 8*

To 2 pounds of pasteurized and homogenized 18% butter fat cream was added 18 grams of starter culture. The inoculated cream was held at 72° F. for 16 hours and then chilled to 45° F. The sour cream had a flat flavor and after 7 days the cream showed excessive sourness and was definitely lacking in well-rounded creamy flavor. Contaminants were present in significant numbers at this time.

*Example 9*

To 2 pounds of pasteurized and homogenized 18% butter fat cream were added 0.07% sorbic acid and 90 grams of actively growing microorganisms of the genus Leuconostoc. These aroma formers were previously carried in sterilized whole milk and had reached total counts of 700,000,000 per gram. The inoculated cream was held at 72° F. for 18 hours and then 18 grams of starter culture was added. After incubation at 72° F. for 16 hours the product was chilled to 45° F. The cultured cream had a fresh, clean flavor which persisted even after 2 weeks' storage.

Having thus provided a written description of the present invention and provided specific examples thereof, it should be understood that no undue restrictions or limitations are to be imposed by reason thereof but that the present invention is defined by the appended claims.

We claim:
1. A cultured milk product having a pH of about 4.3 to about 5.5 and consisting essentially of a sorbic acid component selected from the group consisting of sorbic acid, sodium sorbate, potassium sorbate, and calcium sorbate in an amount equivalent to about 0.025% to about 0.15% sorbic acid, and large numbers of actively growing flavor microorganisms of the family Lactobacteriaceae.

2. A cultured milk product according to claim 1 wherein said microorganisms are of the genus Leuconostoc.

3. A cultured milk product inoculated with large numbers of actively growing flavor microorganisms of the family Lactobacteriaceae and consisting essentially of a sorbic acid component selected from the group consisting of sorbic acid, sodium sorbate, potassium sorbate, and calcium sorbate in an amount equivalent to about 0.025% to about 0.15% by weight sorbic acid, said cultured milk product having a pH of about 4.3 to 5.5.

4. A cultured milk product according to claim 3 wherein said microorganisms are of the genus Leuconostoc.

5. A cultured milk product inoculated with about 1% to 15% by weight of said milk product of actively growing flavor microorganisms of the genus Leuconostoc and consisting essentially of a sorbic acid component selected from the group consisting of sorbic acid, sodium sorbate, potassium sorbate, and calcium sorbate in an amount equivalent to about 0.025% to about 0.15% by weight sorbic acid, said cultured milk product having a pH of about 4.3 to about 5.5.

6. A cultured milk product inoculated with about 8% to 10% by weight of said milk product of actively growing flavor microorganisms of the genus Leuconostoc and consisting essentially of a sorbic acid component selected from the group consisting of sorbic acid, sodium sorbate, potassium sorbate and calcium sorbate, in an amount equivalent to about 0.025% to 0.15% sorbic acid, said cultured milk product having a pH of about 4.3 to about 5.5.

7. A two stage fermentation process for producing a cultured milk product which comprises inoculating a milk substrate with large numbers of flavor-forming microorganisms of the family Lactobacteriaceae, incubating said inoculated milk substrate for a period of about 4 to 48 hours at a temperature of about 50° F. to about 90° F. adding a starter culture and incubating same for an additional 4 to about 48 hours at temperatures of about 50° F. to 90° F., and adding salt and sufficient sorbic acid component selected from the group consisting of sorbic acid, sodium sorbate, potassium sorbate and calcium sorbate such that the final product contains about 0.025% to about 0.15% sorbic acid.

8. A process according to claim 7 wherein said flavor-forming microorganisms are of the genus Leuconostoc.

9. A process of producing a cultured milk product which comprises inoculating a milk substrate with about 8 to 10% by weight of said milk substrate of flavor-forming microorganisms of the genus *Leuconostoc,* incubating said inoculated milk substrate for a period of about 4 to 48 hours at temperatures in the range of about 50° F. to about 90° F., adding a starter culture and incubating same for about an additional 4 to about 48 hours at temperatures of about 50° F. to about 90° F., and adding salt and sufficient sorbic acid component selected from the group consisting of sorbic acid, sodium sorbate, potassium sorbate, and calcium sorbate such that the final product contains about 0.025% to about 0.15% sorbic acid.

10. A process according to claim 9 wherein said fermented milk substrate is admixed with curd.

11. A process according to claim 9 wherein said microorganisms were incubated for a period of about 10 to 18 hours at a temperature of about 60° F. to about 80° F.

12. A process of producing a creamed cultured milk product which comprises inoculating a milk substrate with large numbers of actively growing flavor-forming microorganisms of the family Lactobacteriaceae, incubating said milk substrate for a period of about 4 to 24 hours at temperatures in the range of about 50° F. to about 90° F., adding salt and sufficient sorbic acid component selected from the group consisting of sorbic acid, sodium sorbate, potassium sorbate, and calcium sorbate to said fermented milk substrate such that the final product contains about 0.25% to 0.15% sorbic acid and chilling said substrate prior to mixing said substrate with a curd having a pH of about 4.3 to about 5.5.

13. A process of producing a creamed cultured milk product which comprises preparing a preliminary fermentation of a milk substrate containing about 0.02% to about 0.15% of a sorbic acid component selected from the group consisting of sorbic acid, sodium sorbate, potassium sorbate, and calcium sorbate by inoculating said milk substrate with large numbers of actively growing flavor microorganisms of the genus Leuconostoc, incubating said inoculated milk substrate for a period of about 4 to 24 hours at a temperature of about 50° F. to 90° F., adding salt and about 0.08% to about 0.30% of a sorbic acid component selected from the group consisting of sorbic acid, sodium sorbate, potassium sorbate, and calcium sorbate to said fermented milk substrate and chilling the same prior to mixing with a curd having a pH of about 4.3 to about 5.5.

14. A process of preparing a creamed cultured milk product which comprises preparing a preliminary fermentation of cream containing about 0.02% to about 0.15% of a sorbic acid component selected from the group consisting of sorbic acid, sodium sorbate, potassium sorbate, and calcium sorbate by inoculating said cream with about 8 to 10% of actively growing flavor-forming microorganisms of the genus Leuconostoc, incubating said inoculated cream for a period of about 4 to 48 hours at temperatures of about 50° F. to about 90° F., adding salt and about 0.08% to about 0.30% of a sorbic component selected from the group consisting of sorbic acid, sodium sorbate, potassium sorbate, and calcium sorbate to said fermented cream and chilling same prior to mixing with a curd having a pH of about 4.3 to about 5.5.

15. A process according to claim 14 wherein said inoculated preliminary fermentation of cream is incubated for about 10 to 18 hours at a temperature of about 60° to about 80° F.

16. A process according to claim 14 wherein said cultured milk product is creamed cottage cheese.

17. A process for preparing creamed cottage cheese in which sterilized whey is used to grow flavor-forming microorganisms of the genus Leuconostoc which comprises inoculating said sterilized whey with large numbers of said flavor forming microorganisms, incubating said inoculated whey at temperatures of about 60° F. to 80° F. for about 12 to 20 hours until the numbers of said microorganisms are in the range corresponding to that of fully cultured milk, mixing said fermented whey in 50–50 proportion with a cream containing about 24% to 36% butter fat and containing about 0.1% to about 0.60% sorbic acid and mixing the resultant mass with curd.

18. A process for improving pot cheese comprising adding large numbers of actively growing bacteria of the genus Leuconostoc to a milk substrate containing about 0.01 to about 0.06% of a sorbic acid component selected from the group consisting of sorbic acid, sodium sorbate, potassium sorbate, and calcium sorbate prior to the introduction of a starter culture, and after culturing, cutting, cooking and draining said cultured milk substrate; adding additional sorbic acid component selected from the group consisting of sorbic acid, sodium sorbate, potassium sorbate and calcium sorbate to said cultured substrate in amounts such that the final product contains about 0.025% to about 0.15% sorbic acid.

19. A process according to claim 18 wherein said sorbic acid component, salt and a heavy suspension of the genus cells of Leuconostoc are worked into the product following culturing.

20. A process for producing cottage cheese curd of a high quality flavor comprising spraying onto said curd a suspension of actively growing microorganisms of the genus Leuconostoc in whey, containing about 0.1 to about 0.9% sorbic acid as sodium sorbate.

21. A process for producing cottage cheese curd of a high quality flavor comprising spraying onto said curd a suspension of actively growing microorganisms of the genus Leuconostoc in whey, containing about 0.1 to about 0.9% sorbic acid as potassium sorbate.

References Cited in the file of this patent

UNITED STATES PATENTS

| 2,379,294 | Gooding | June 26, 1945 |
|---|---|---|
| 2,865,764 | Gorsica et al. | Dec. 23, 1958 |

UNITED STATES PATENT OFFICE
CERTIFICATE OF CORRECTION

Patent No. 3,022,176　　　　　　　　　　　　February 20, 1962

Robert L. Lawrence et al.

It is hereby certified that error appears in the above numbered patent requiring correction and that the said Letters Patent should read as corrected below.

Column 5, line 47, for "favor" read -- flavor --; column 7, line 8, for "0.25%" read -- 0.025% --; column 8, lines 27 and 28, for "suspension of the genus cells of" read -- suspension of cells of the genus --.

Signed and sealed this 12th day of June 1962.

(SEAL)
Attest:

ERNEST W. SWIDER
Attesting Officer

DAVID L. LADD
Commissioner of Patents